(12) United States Patent
Qin et al.

(10) Patent No.: US 11,207,963 B2
(45) Date of Patent: Dec. 28, 2021

(54) CROSSMEMBER FOR A VEHICLE BATTERY TRAY

(71) Applicant: Shape Corp., Grand Haven, MI (US)

(72) Inventors: Zehua Qin, Norton Shores, MI (US); Matthew Kuipers, Holland, MI (US); Mark C. Stephens, Grand Rapids, MI (US)

(73) Assignee: Shape Corp., Grand Haven, MI (US)

( * ) Notice: Subject to any disclaimer, the term of this patent is extended or adjusted under 35 U.S.C. 154(b) by 36 days.

(21) Appl. No.: 16/881,136

(22) Filed: May 22, 2020

(65) Prior Publication Data

US 2020/0384842 A1 Dec. 10, 2020

Related U.S. Application Data

(60) Provisional application No. 62/856,804, filed on Jun. 4, 2019.

(51) Int. Cl.
*B60K 1/04* (2019.01)
*B62D 25/20* (2006.01)
*B60K 6/28* (2007.10)

(52) U.S. Cl.
CPC .............. *B60K 1/04* (2013.01); *B62D 25/20* (2013.01); *B60K 6/28* (2013.01); *B60K 2001/0438* (2013.01); *B60Y 2200/91* (2013.01); *B60Y 2200/92* (2013.01)

(58) Field of Classification Search
CPC .................................. B62D 25/20; B60K 1/04
See application file for complete search history.

(56) References Cited

U.S. PATENT DOCUMENTS

| | | | | |
|---|---|---|---|---|
| 5,534,364 A | * | 7/1996 | Watanabe | ............... B60L 50/66 429/61 |
| 6,227,322 B1 | * | 5/2001 | Nishikawa | ........... B62D 29/008 180/68.5 |

(Continued)

FOREIGN PATENT DOCUMENTS

| CN | 201777299 U | 3/2011 |
|---|---|---|
| CN | 109802062 A | 5/2019 |

(Continued)

OTHER PUBLICATIONS

International Search Report, PCT/US2020/034156, dated Aug. 20, 2020, 7 pages.

*Primary Examiner* — James A Shriver, II
*Assistant Examiner* — James J Triggs
(74) *Attorney, Agent, or Firm* — Bodman PLC

(57) ABSTRACT

A crossmember for a vehicle battery tray provides a beam that has a closed cross-sectional shape with a top wall coupled with parallel side walls along a length of the beam. A reinforcing top cap is disposed along the beam, where a C-shaped transverse cross-sectional shape of the top cap has a central section that disposed along the top wall and legs of the top cap welded to the side walls. The legs include inward angled tabs that are biased against the beam and welded thereto. The top wall of the beam and the central section of the top cap have aligned fastener openings disposed at spaced intervals along the length of the beam and configured to receive fasteners that secure at least one of a battery module or tray cover to the crossmember.

20 Claims, 9 Drawing Sheets

(56) References Cited

U.S. PATENT DOCUMENTS

| | | | | |
|---|---|---|---|---|
| 2011/0143179 A1* | 6/2011 | Nakamori | ............ | B62D 29/041 |
| | | | | 429/99 |
| 2013/0266840 A1* | 10/2013 | Fujii | ................... | H01M 10/647 |
| | | | | 429/120 |
| 2018/0062224 A1* | 3/2018 | Drabon | ............... | H01M 10/615 |
| 2018/0138477 A1* | 5/2018 | Handning | ............. | H01M 50/20 |
| 2018/0194211 A1 | 7/2018 | Hamilton et al. | | |
| 2020/0223304 A1* | 7/2020 | Bikmukhametov | ..... | B60K 1/04 |
| 2020/0384842 A1* | 12/2020 | Qin | ........................ | B62D 25/20 |

FOREIGN PATENT DOCUMENTS

| | | |
|---|---|---|
| FR | 1011256 A | 6/1952 |
| JP | 2019038403 A | 3/2019 |

* cited by examiner

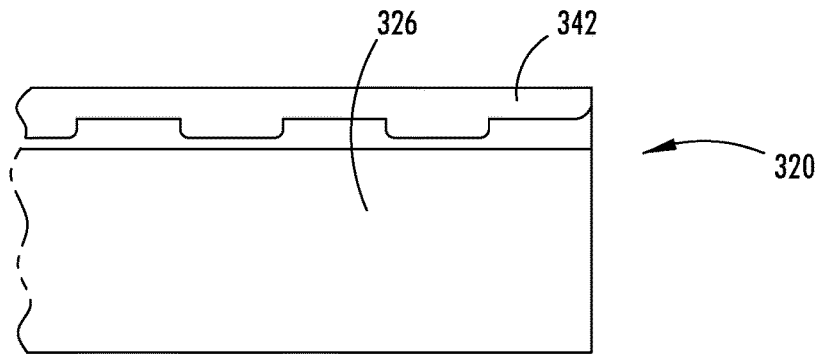
FIG. 8
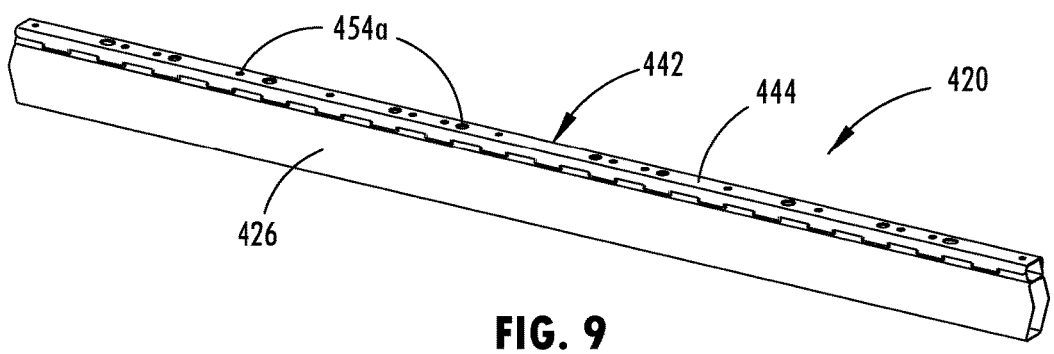
FIG. 9
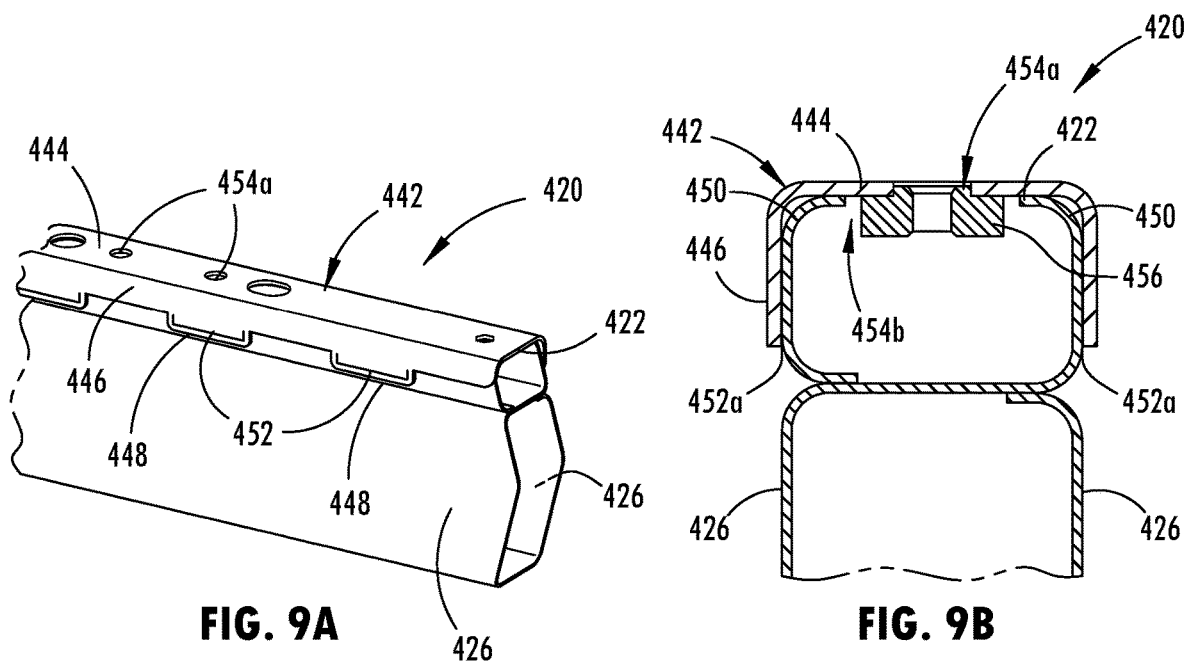
FIG. 9A    FIG. 9B

CROSSMEMBER FOR A VEHICLE BATTERY TRAY

CROSS-REFERENCE TO RELATED APPLICATION

This application claims priority under 35 U.S.C § 119(e) to U.S. Provisional Patent Application No. 62/856,804, filed Jun. 4, 2019, the disclosure of this prior application is considered part of this application and is hereby incorporated by reference in its entirety.

TECHNICAL FIELD

The present disclosure generally relates to structural members and beams, and more particularly relates to vehicle crossmembers, such as for a vehicle battery tray or case.

BACKGROUND

Electrically powered vehicles are typically designed to locate and package battery modules within battery trays or cases that protect the batteries from damage when driving in various climates and environments, and also that protect the batteries from different types of impacts. It is fairly common for vehicle battery trays to be located in a portion of the frame or sub-structure of the vehicle, such as between the axles and near the floor of the vehicle, which can distribute the weight of the batteries across the vehicle frame and establish a low center of gravity for the vehicle. To increase battery carrying capacity and improve lateral intrusion resistance of battery trays, such as from side impacts, battery trays may include cross member supports that span laterally within the battery tray housing.

SUMMARY

The present disclosure provides a crossmember for a vehicle battery tray, such as for an all-electric or hybrid electric vehicle. The structure of a vehicle battery tray may include crossmembers that span along or over a floor of the battery tray and attach to the interior sides of a perimeter wall of the battery tray. The battery modules may be arranged between the crossmembers in the battery containment area of the tray structure and may be secured to the crossmembers for stability. The battery containment area may also be substantially enclosed with a cover that can attach to the crossmembers. The present crossmember is designed with a portion that is capable of engaging and supporting battery modules and/or a cover of the battery tray, while also providing an optimized width that does not compromise space available for battery modules in the battery containment area, among other considerations. For example, the upper portion of the cross member may be strengthened by the cross-sectional geometry of a beam, such as a roll-formed, closed cross-sectional beam that increases the material mass along the upper portion of the beam. As another example, the upper portion of the crossmember may be reinforced, such as with a top cap that increases the material thickness and overall strength of the top wall. The top cap may be fixed to the crossmember beam by welding inward biased tabs to outside surfaces of the beam. As a further example, the upper portion of the crossmember may be provided with a top wall that is attached to upper edges of the side walls of a beam, such that the top wall may have a larger thickness than the side walls. The top wall and side walls may also be attached together to form T-joints on opposing sides of threaded receivers that are disposed along the upper portion of the beam.

According to one aspect of the present disclosure, a crossmember for a vehicle battery tray includes a beam that has a closed cross-sectional shape with a top wall coupled with parallel side walls along a length of the beam. A reinforcing top cap has a C-shaped transverse cross-sectional shape that has a central section disposed along the top wall of the beam and legs extending from opposing sides of the central section. The legs are attached to the side walls of the beam, where each include a plurality of tabs welded to the side walls. The top wall of the beam and the central section of the top cap have aligned fastener openings disposed at spaced intervals along the length of the beam. In some implementations, a plurality of threaded receivers are disposed at the aligned fastener openings to engage a fastener inserted through the fastener openings to secure at least one of a battery module or tray cover to the crossmember.

According to another aspect of the present disclosure, a crossmember for a vehicle battery tray includes a beam that has side walls spaced from each other along a length of the beam. A reinforcing top cap is disposed along an upper portion of the beam and spans between the side walls. The reinforcing top cap includes a series of tabs that are disposed along the length of the beam and that extend down from opposing sides of a central section of the top cap to attach to the side walls of the beam. The series of tabs are each individually welded to the respective side wall. The reinforcing top cap includes fastener openings that extend through the central section of the top cap at spaced intervals along the length of the beam. Optionally, the tabs of the reinforcing top cap may extend at an inward angle toward each other as they extend downward from the central section to be biased against outside surfaces of the beam for providing a stable weld condition.

According to yet another aspect of the present disclosure, a crossmember for a vehicle battery tray includes a beam having side walls separated from each other along a length of the beam. A top wall is coupled with upper edges of the side walls along the length of the beam, where the top wall has a greater thickness than the side walls. The top wall includes fastener openings disposed at spaced intervals along the length of the beam. A plurality of threaded receivers are attached to the top wall in alignment with the fastener openings and are configured to threadably engage a fastener inserted through the fastener openings to secure at least one of a battery module or tray cover to the top wall. The plurality of threaded receivers may be disposed between the side walls, which may be separated at a constant spacing along the length of the beam. In some examples, the plurality of threaded receivers include at least one of a dowel nut, a slot nut, a self-pierce and clinch nut, or a weld nut.

These and other objects, advantages, purposes, and features of the present disclosure will become apparent upon review of the following specification in conjunction with the drawings.

BRIEF DESCRIPTION OF THE DRAWINGS

FIG. 8 is a side elevation view of an end of a crossmember;

FIG. 9 is an upper perspective view of a crossmember;

FIG. 9A is an upper perspective view of an end of the crossmember shown in FIG. 9;

FIG. 9B is a cross-sectional view of the crossmember shown in FIG. 9;

DETAILED DESCRIPTION

Figure 1:
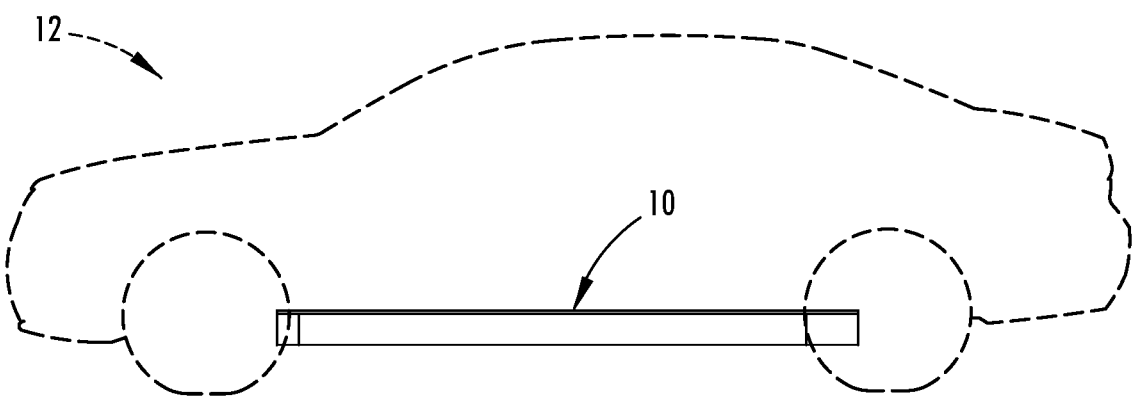
FIG. 1 is a side elevation view of a vehicle illustrating a location of a battery tray.

Referring now to the drawings and the illustrative embodiments depicted therein, a vehicle battery tray or structure 10 is provided for supporting and protecting batteries, such as battery packs or modules or the like, for powering and operating electric motors and other electrical components of an electric or hybrid-electric vehicle, such as the battery powered electric vehicle 12 (BEV) shown in FIG. 1. The battery tray 10 may be attached or mounted at or near the lower portion of the vehicle 12, such as at the lower frame or rocker rails, which may also locate the batteries contained in the battery tray 10 in a central location on the vehicle 12. Such a low and centralized location may avoid damage and disruption to the batteries by being spaced away from probable impact locations on the vehicle frame, such as near the front and rear bumper areas. Also, such a mounting location of the tray 10 suspended and spanning below an interior cabin of the vehicle 12 may allow for a large battery capacity and may evenly distribute the weight of the batteries on the vehicle frame and may provide the vehicle 12 with a relatively low center of gravity due to the substantial weight of the batteries held in the battery tray 10. The battery tray 10 may be disengaged or detached from the rocker rails or other frame structure of the vehicle 12, such as for replacing or performing maintenance on the batteries or related electrical components.

Figure 2:
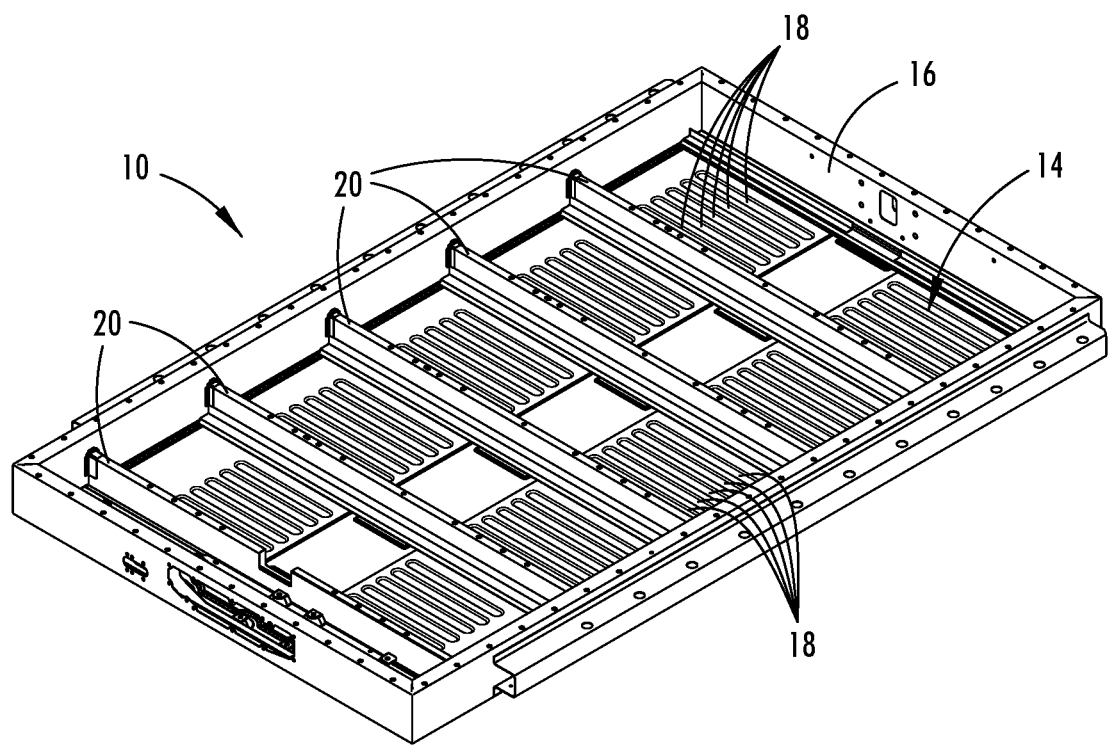
FIG. 2 is an upper perspective view of a vehicle battery tray, showing crossmembers.

As shown in FIG. 2, the battery tray 10 is provided with a floor panel 14 that forms the bottom of the containment area of the battery tray 10. When the battery tray 10 is engage with the lower portion of the vehicle 12, the floor panel 14 of the battery tray 10 may be span below the interior cabin in generally parallel with the floor of the interior cabin of the vehicle 12, such that the floor panel 14 of the battery tray 10 may form the bottom or lowermost undercarriage surface of the vehicle 12. The battery tray 10 also includes a perimeter containment wall 16 that is disposed around a peripheral edge of the of the floor panel 14 to substantially surround a battery containment area of the battery tray 10. The perimeter containment wall 16 is formed by at least one perimeter reinforcement member that extends along at least one section or side of the peripheral edge of the floor panel 14 to provide a protective barrier around the battery containment area. Thus, the perimeter wall 16 may be a single beam or segmented into separate members or beams that are attached together at the ends. As shown in FIG. 2, the peripheral shape of the perimeter wall 16, when viewed from above, may be generally rectangular or square shaped, where the corners of the perimeter wall 16 are approximately 90 degrees. However, it is contemplated that a perimeter containment wall and overall battery tray may be formed in various shapes, such as to accommodate various vehicle body types and designs.

The floor panel 14, such as shown in FIG. 2, is a generally planar structure and may include formations adapted to improve structural stiffness of the floor panel 14 and to adapt the floor panel 14 for holding the battery modules. The floor panel 14 is shown in FIG. 2 with groupings of elongated depressions 18 that extend laterally on the floor panel 14 below sections of the battery containment area that are each directly below a battery module. Such elongated depressions 18 increase lateral stiffness of the floor panel 14, while also providing air flow channels below the battery modules. The floor panel 14 may also have a sealed connection along the bottom surface of the perimeter wall 16, such as via welding, adhesive, or fasteners or the like. The sealed connection between the floor panel 14 and the perimeter wall 16 may be reinforced or supplemented with a sealing agent or sealing material, such as an epoxy, silicone sealant, gasket material, or the like.

With further reference to FIG. 2, the battery tray 10 has crossmembers 20 that span along or over a floor panel 14 of the battery tray and attach between the inside surfaces of the perimeter wall 16. The crossmembers 20, as shown in in FIG. 2, may extend laterally between the sides sections of the perimeter wall 16 to transmit lateral loads and impact forces through generally linear load paths along the crossmembers 20 to prevent laterally inward deformation to the perimeter wall 16 and thus limit disruption to the battery containment area. The battery modules may be arranged between the crossmembers 20 in the battery containment area of the tray structure and may be attached or secured to the crossmembers 20 for stability. The battery containment area may also be substantially enclosed with a cover that can attach to the crossmembers 20. The crossmembers 20 may be formed to have a height that is less than or equal to the height of the perimeter wall 16, such that the crossmembers 20 may function as a barrier between sections of the battery containment area.

Figure 3:
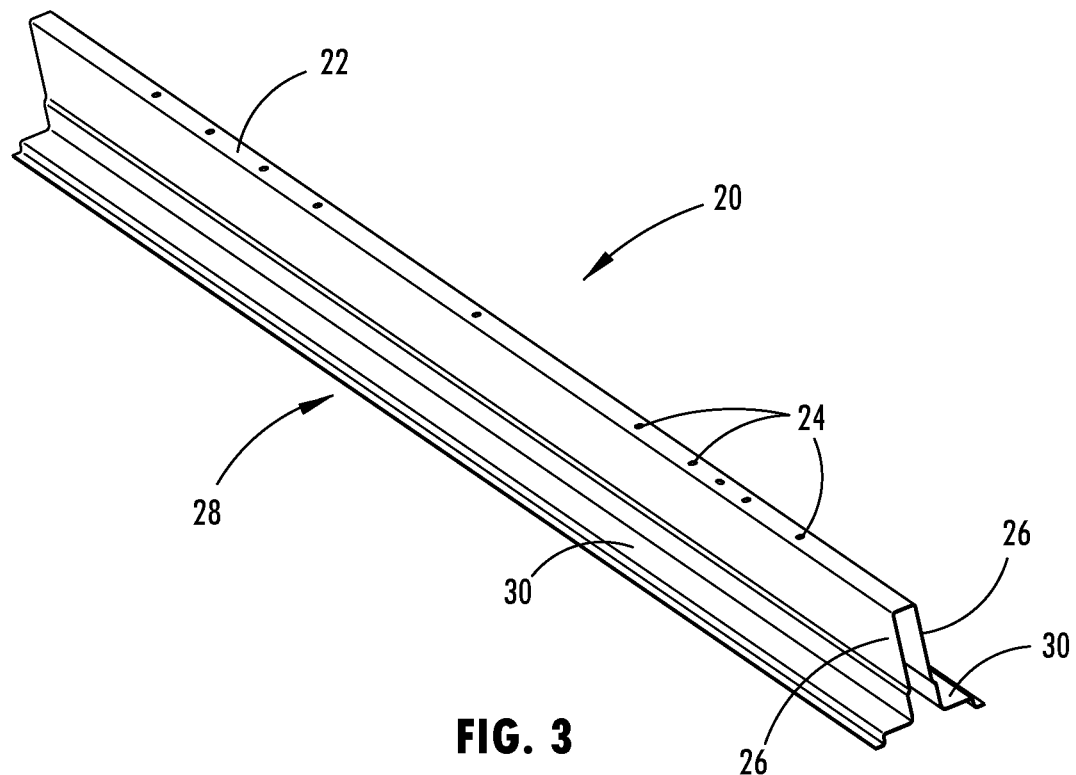
FIG. 3 is an upper perspective view of the crossmember shown in FIG. 2.
Figure 3A:
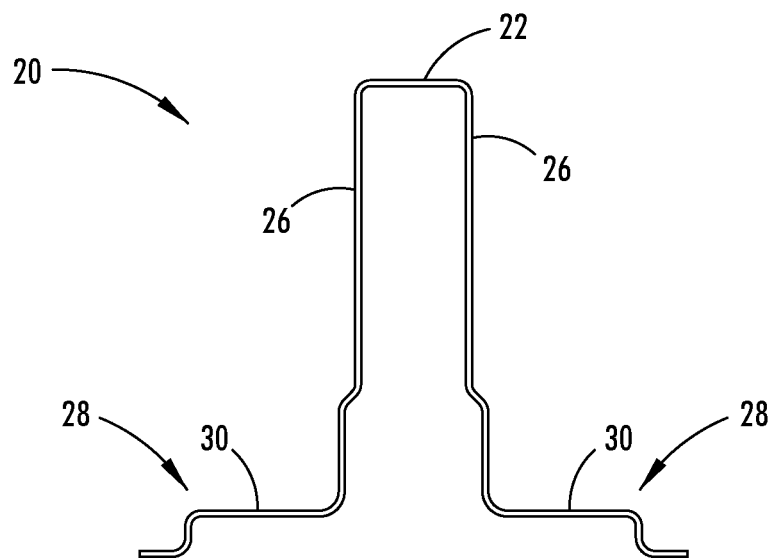
FIG. 3A is a cross-sectional view of the crossmember shown in FIG. 3.

As shown in FIGS. 3 and 3A, the crossmember 20 may be a beam that has an open cross-sectional shape that is capable of engaging and supporting battery modules and/or a cover of the battery tray. The top wall 22 of the crossmember 20 is generally planar and has a width that allows fastener openings 24 to be formed through the top wall 22 at spaced intervals along the length of the beam. The beam of the crossmember may be integrally formed, such as a sheet of material that is roll formed (i.e. a high-strength steel alloy) or an extruded material (i.e. an aluminum alloy), where the top wall 22 may be integrally coupled with side walls 26 of the beam that extend downward from opposing edges of the top wall 22 toward the floor of the battery tray. As shown in in FIG. 3A, the side walls 26 are generally planar and parallel with each other, such that there is a generally equal spacing provided between the side walls 26 along the length of the beam. The lower end of each of the side walls 26 is integrally connect with a stepped foot section 28 that is configured to attach to the floor panel 14 of the batter tray 10, such as via welding. The stepped foot section 28 may also provide an upward-facing surface 30 that is configured to support a portion of a battery module that is stored in the battery tray.

Figure 4:
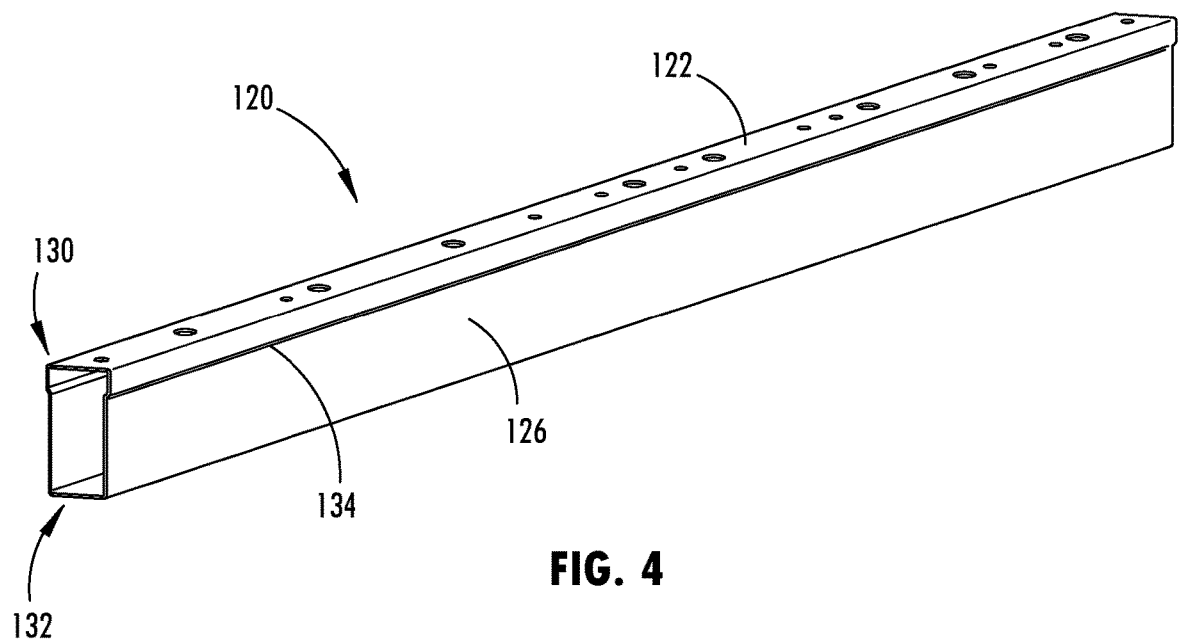
FIG. 4 is an upper perspective view of a crossmember.
Figure 6:
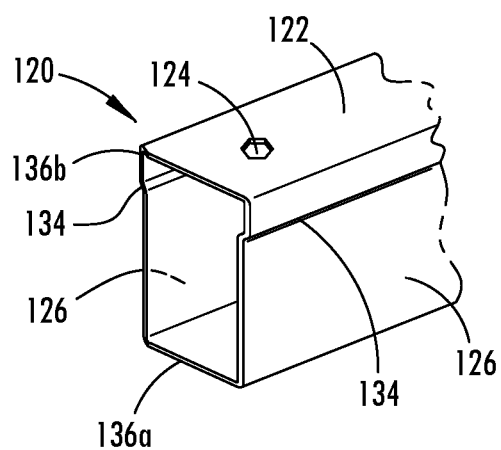
FIG. 6 is an upper perspective view of an end of the crossmember shown in FIG. 4.

As shown in FIGS. 4 and 6, an additional example of a crossmember 120 is shown that has a closed cross-sectional shape that is configured to support a battery module and/or a cover of the battery tray at a top wall 122 of the beam. The top wall 122 of the beam shown in FIGS. 4 and 6 is reinforced by the cross-sectional shape of the beam, which has an increased width along an upper portion 130 of the beam. The width of the lower portion 132 of the beam, below the upper portion 130, is reduced to provide an optimized width that does not compromise space available for battery modules to be held in the battery containment area. The increased width at the top wall 122 of the beam also increases the material mass along the upper portion 130 of the beam. A transition bend 134 at opposing side walls 126 of the beam, between the upper portion 130 and the lower portion 132 of the beam, may provide increased bending stiffness along the length of the crossmember 120, which may also allow for a thinner gauge material to be used, such as a high-strength steel, aluminum, or other metal.

Figure 5:
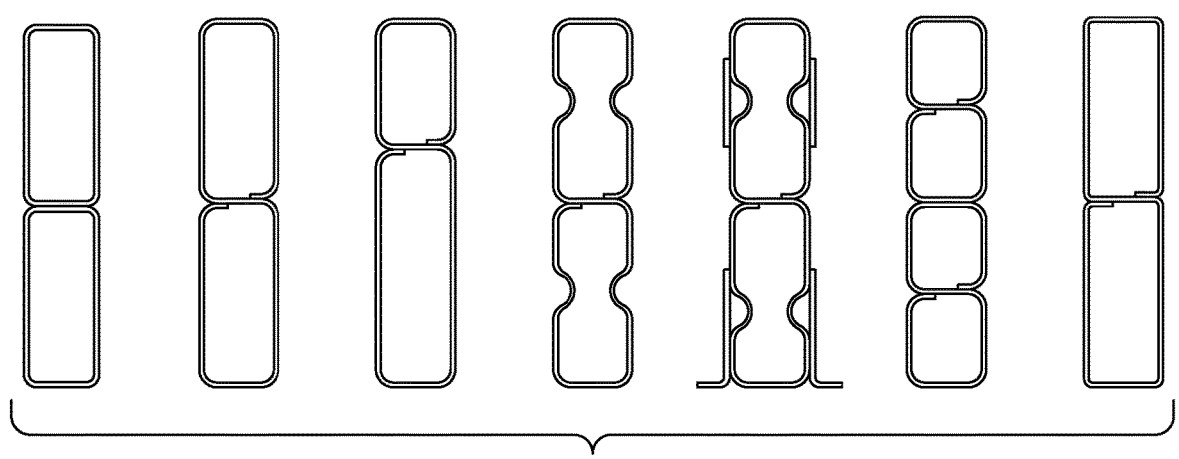
FIG. 5 shows cross-sectional views of multiple exemplary crossmembers.

Depending on the crossmember loading requirements, tray design, and desired material, among other conceivable factors, different examples of the crossmember may have various different cross-sectional shapes that may be used to improved transverse loading of the crossmember, such as with battery modules and cover engagement, while maintaining a narrow profile that allows for optimized battery carrying capacity of the tray. For example, as shown in FIG. 5, various cross-sectional shapes may be formed with roll formed sheet material, such as high-strength steel, that provides various load performance options.

Figure 6A:
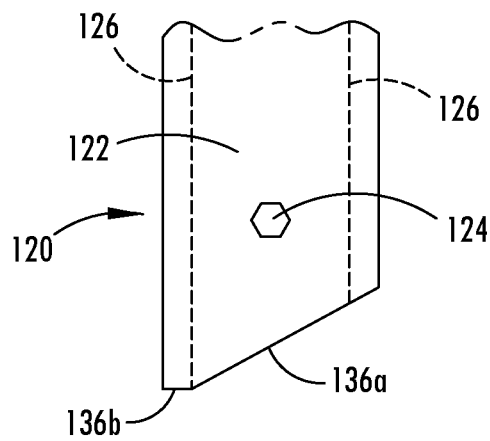
FIG. 6A is a top plan view of the end of the crossmember shown in FIG. 6.

The axial ends of the crossmember may also be configured to attach consistently along the interior side surface of the peripheral wall of the battery tray, such that there is constant contact along the peripheral edges of the axial ends of the beam. Such contact may be made with an intermediate weld or bonding material, such as a sealer or adhesive or the like. For sections of a battery tray that have non-parallel opposing portions of the peripheral wall, the axial ends of the beam may be cut or trimmed, such as with a laser cutter, to make the peripheral edges of the axial ends correspond with the shape of the interior side surfaces of the opposing portions of the peripheral wall. As shown in FIGS. 6 and 6A, the beam of the crossmember 120 has an axial end with an edge that is formed with one angled portion 136a disposed along a vertical plane angled from the vertical plane that is perpendicular to the longitudinal extent of the beam and that forms the other portion 136b of the edge of the axial end of the beam. Thus, the axial ends of the beam may be cut at one or more angled vertical planes, such as to correspond with the surfaces of the peripheral side wall engaged by the axial ends.

Figure 7:
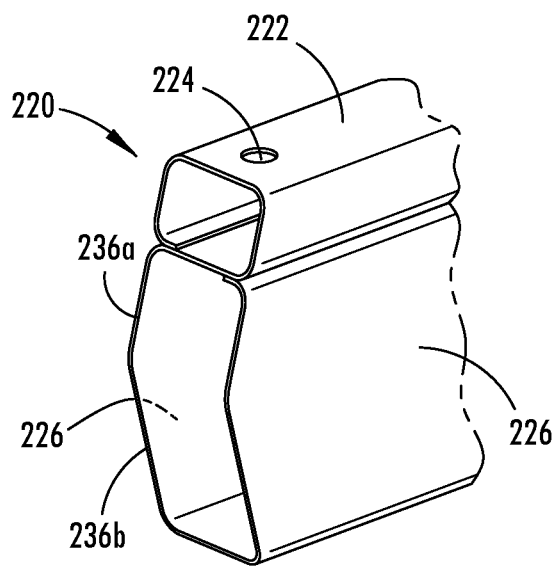
FIG. 7 is an upper perspective view of an end a crossmember.
Figure 7A:
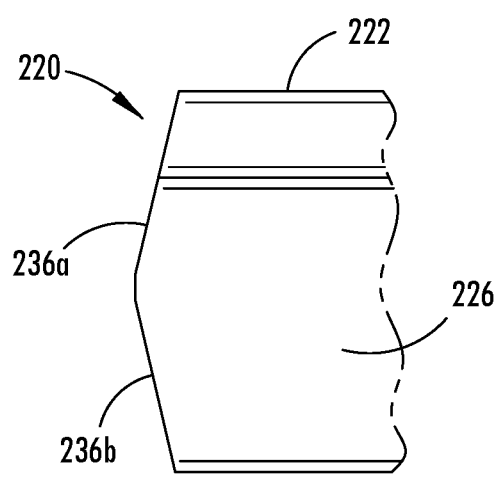
FIG. 7A is a side elevation view of the end of the crossmember shown in FIG. 7.

Moreover, for portions of a peripheral wall that do not have vertical or planar interior sides surfaces, the axial ends of the beam may also or alternative be formed with an angled or non-linear shape to make the peripheral edges of the axial ends correspond to such interior side surfaces. For example, as shown in FIGS. 7 and 7A, the beam of a crossmember 220 has an axial end with an edge that is formed with an upper angled portion 236a disposed along a lateral plane angled upward from a vertical plane that is perpendicular to the longitudinal extent of the beam. The axial end edge of the crossmember 220 shown in FIG. 7A also has a lower angled portion 236b disposed along a lateral plane angled downward from a vertical plane that is perpendicular to the longitudinal extent of the beam lower portion. Accordingly, the axial ends of the crossmember may be cut or trimmed in multiple planes at various angles and shapes to provide the desired peripheral edge contact and engagement with the peripheral wall of the battery tray.

In addition or in the alternative to cutting or trimming the axial ends of the beam of the crossmember, the crossmember may include end brackets that engage against the interior side surfaces of the peripheral wall of the battery tray. For instance, as shown in FIG. 8, the crossmember 320 includes an axial end that is cut perpendicular to the length of the crossmember, such that end brackets may be attached to the side wall 326 of the beam. AN exemplary end brackets may extends toward the peripheral wall at an angle and configuration that mates in constant contact against the interior side surfaces of the peripheral wall. By attaching end brackets to the axial ends of the beam, the beam may be cut in a plane that is perpendicular to the longitudinal extent of the beam, which can be done in-line on a roll former.

Another example of a crossmember 420, such as shown in FIGS. 9-9B, has an upper portion that is reinforced with a top cap 442. The top cap 442 may provide an increased material thickness relative to the top wall 422 of the beam and may increase the overall strength of the upper portion of the beam 421. As shown in FIG. 9A, the beam 421 has a closed cross-sectional shape with the top wall 422 coupled with parallel side walls 426 along a linear length of the beam 421. The closed cross-sectional shape of the beam 421 shown in FIG. 9A is further defined by a roll formed geometry, which may be referred to as a mono-leg as shown in FIG. 5, which provides two adjacent tubular profiles that have hollow openings that are divided by a common center wall of the beam that is generally parallel with the top wall 422. With such a monoleg profile, the upper tubular profile may have a smaller hollow interior area than the lower tubular profile, such as shown in FIG. 9, which provides increased mass at the upper portion of the beam and increase bending strength along the top wall 422. However, it is contemplated that a top cap may be attached to various types or shapes of crossmember beams to increase the load capacity of the crossmember along the top wall.

The top cap 442 may having a C-shaped transverse cross-sectional shape with a central section 444 that is disposed along the top wall 422 of the beam and legs 446 that are fixed to the side walls 426 of the beam. The legs 446 of the top cap 442 may angle inward to fit and secure the top cap 442 to the beam of the crossmember 420, while allowing for dimensional tolerance variations to the width of the upper portion of the beam. To further accommodate such tolerance variations, the legs 446 of the top cap 442 may flex outward when being pressed onto the beam, which results in the legs 446 having an inward bias force against the side walls 426 of the beam. As shown in FIG. 9B, the upper corners 450 of the beam that extend along opposing sides of the top wall 422 may include a radius of curvature that provides a curved outer surface at the corners 450. To fit the top cap 442 to the beam, the top cap 442 may be pressed down over the upper portion of the beam so that the lower edges of the legs 446 or tabs 448 contact the curved outer surface of at the corners 450 of the beam. As force is applied to the top cap 442, the curved corners 450 of the beam cause the legs 446 of the top cap 442 to progressively open outward to allow the legs 446 to slide over the corners 450 and down the side walls 426 of the beam. The outward elastic bend of the legs 446 and/or tabs 448 may result in retention of an inward bias that assists with providing consistent contact of the edges of legs 446 or tabs 448 along the side walls 426, which is a preferable welding condition. Thus, the range of bending movement of the legs allows for an associated degree of tolerance in the width of the beam.

The legs 446 of the top cap 442 may include tabs 448, such as shown in FIG. 9A, that are spaced along the lower edge of the legs 446 at generally consistent spacing intervals. The top cap 442 may be fixed or attached to the crossmember beam by welding the lower edge of the legs 446 to outside surfaces 426 of the beam. The undulation of the lower edge provided by the tabs 448 provides an increased available weld area and potential edge contact between the top cap 442 and the beam in comparison to an otherwise linear lower edge to the top cap. As shown in FIG. 9A, the tabs 448 have a generally rectangular shape with rounded corners, such that a weld 452 may be formed (i.e. by laser welding or electric resistance welding) along the tabs 448, such as by forming a C-shaped weld 452 along the lower edge portion of the tabs 448. The shape and orientation of the tabs along on the outside surfaces of the beam may vary or may be provided in alternative shapes to provide the desired weld. As a further example, as shown in FIG. 9B, the weld 452a is formed at the lower edge of the tabs 448 that are in contact with the side walls 426 of the beam, such as due to the inward bias provided by the inward angle of the legs or tabs alone.

As also shown in FIGS. 9A and 9B, the top wall 422 of the beam and central section 444 of the top cap 442 have aligned fastener openings 454a, 454b that are disposed at spaced intervals along the linear length of the crossmember 420. The axially aligned openings 454a, 454b are configured to receive fasteners that secure at least one of a battery module or tray cover to the crossmember 420. One or both of the fastener openings 454a, 454b may be formed via pre-piecing the metal sheet. A threaded receiver 456, such as a self-pierce and clinch (SPAC) nut, may be fit in and attached to at least one of the aligned fastener openings 454a, 454b, such as via the piecing process prior to roll forming or prior to joining the top cap to the beam. As shown in FIG. 9B, the threaded receivers 456 are configured to threadably engage a fastener 458 that is inserted through the fastener openings, so as to secure at least one of a battery module or tray cover to the crossmember.

With further reference to FIG. 9B, the upper fastener opening 454a that is formed in the central section 444 of the top cap 442 may have a smaller diameter than the lower fastener opening 454b that is formed in the top wall 422 of the beam. The larger diameter of the lower fastener opening 454b allows for a tolerance in the alignment of the openings, as the top cap 442 and the beam may be roll formed with the openings pre-pierced in the sheet, such that at least some tolerance may be needed to consistently align the openings 454a, 454b. Furthermore, the top cap 442 may be formed with a material that is more formable than the beam, such as a 1500 MPa martensitic steel sheet, that is capable of being bent at the corners between the central section 444 and the legs 446 at a radius of 1 T (1 times the thickness of the material), opposed to the beam material that may be only capable of forming the corners 450 along the top wall 422 at a radius of 3 T (3 times the thickness of the material). Due to the corner bending limitations of the beam, the planar upper surface of the top cap 442 may be larger than the planar upper surface of beam, such that the threaded receiver 456 may engage the top cap 442 without engaging the beam, such as shown in FIG. 9B.

Figure 10:
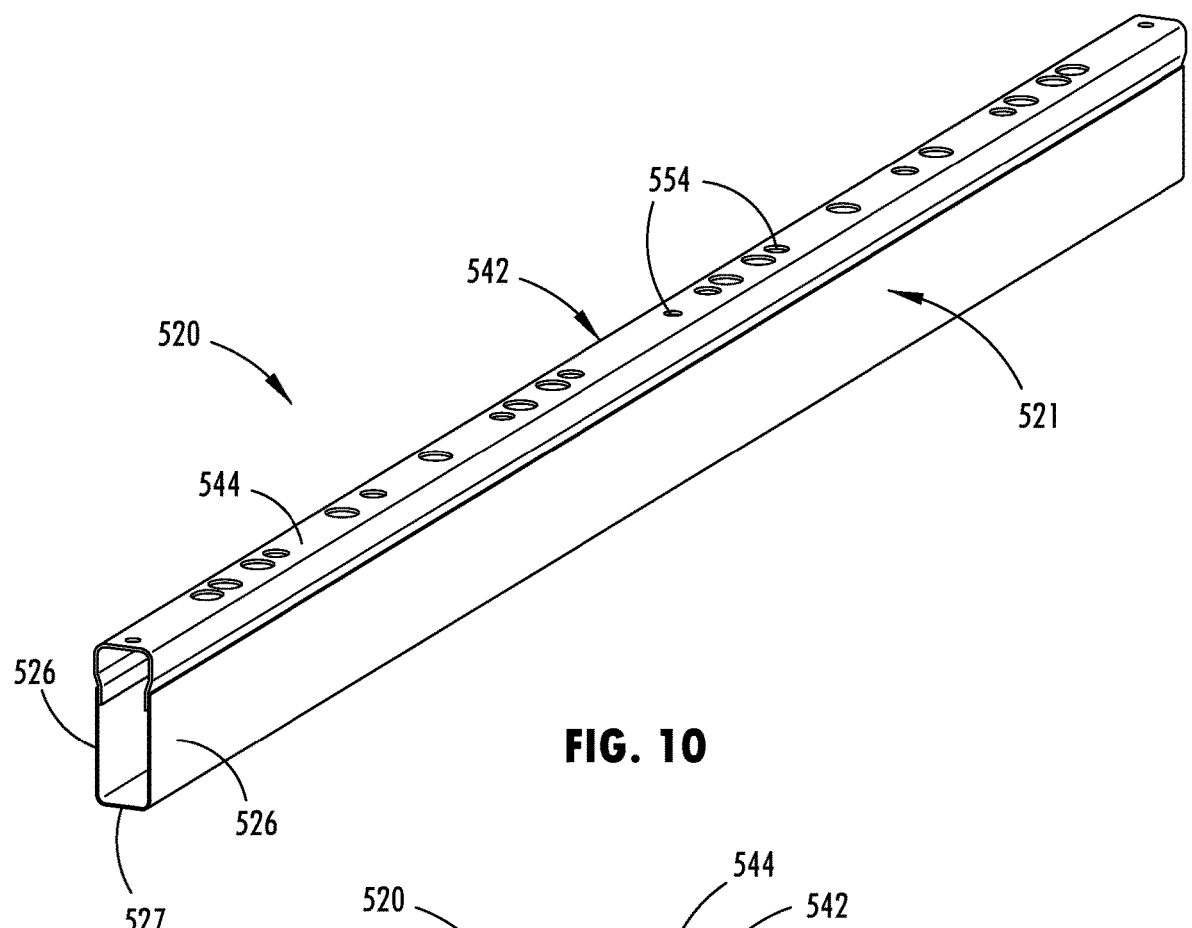
FIG. 10 is an upper perspective view of a crossmember.
Figure 10A:
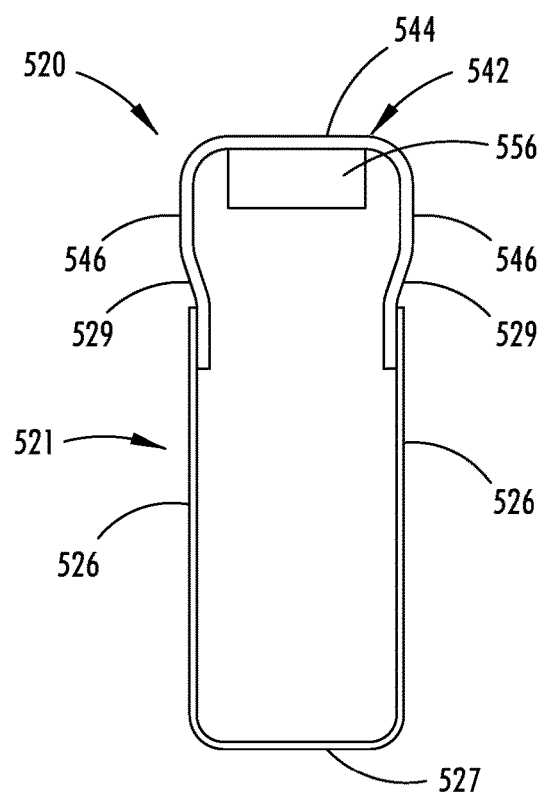
FIG. 10A is a cross-sectional view of the crossmember shown in FIG. 10.

A further example of a crossmember 520, such as shown in FIGS. 10 and 10A, has an upper portion that is reinforced with a top cap 542, although the beam does not have a top wall. As shown in FIG. 10A, the beam 521 has an open cross-sectional shape with the parallel side walls 526 that integrally extend upward from a lower wall 527 of the beam 521 along a linear length of the beam 521. The open cross-sectional shape of the beam 521 shown in FIG. 10A is a U shape, whereby the top cap 542 an inverted U shape that engages the upper portion of the side walls 526. The top cap 542 may be formed from a sheet that has a greater thickness than the sheet of material formed into the beam 541, such as to provide increased mass at the upper portion of the beam and increase bending strength along the top cap.

The inverted U shape of the top cap 542 shown in FIG. 10A may have a central section 544 and legs 546 that integrally extend down from opposing corners of the central section 544 to attach to the side walls 526 of the beam 521. The legs 546 of the top cap 542 may angled inward at an inward transition section 529 near the lower edges of the legs 546 to fit and secure the top cap 542 to the interior of the beam 521. As shown in FIG. 10A, to fit the top cap 542 to the beam 521, the top cap 542 may be pressed down into the exposed upper opening of the beam 521 so that the lower edges of the legs 546 contact the interior surface of the side walls 526 of the beam 521. As force is applied to the top cap 542, the top cap 542 may slide down into the beam until the inward transition section 529 of the top cap 542 engages the upper edges of the side walls 526 of the beam. The resulting inward elastic bend of the legs 546 may result in retention of an outward bias that assists with providing consistent contact of the legs 546 along the side walls 526, which is a stable and preferable welding condition. The top cap 542 may be fixed to the crossmember beam 521 by welding the upper edges of the side walls 526 to the outside surfaces of the legs, such as via laser welding or electric resistance welding or the like.

As also shown in FIGS. 10 and 10A, the top cap 542 may have fastener openings 554 that are disposed at spaced intervals along the linear length of the crossmember 520. The fastener openings 554 may be formed via pre-piecing the metal sheet of the top cap 542 before or after roll forming the top cap 542. A threaded receiver 556, such as a self-pierce and clinch (SPAC) nut, may be fit in and attached to each of the fastener openings 554, such as via the piecing process prior to roll forming or prior to joining the top cap to the beam. As shown in FIG. 10A, the threaded receivers 556 are configured to threadably engage a fastener 558 that is inserted through the fastener openings, so as to secure at least one of a battery module or tray cover to the crossmember.

Figure 11:
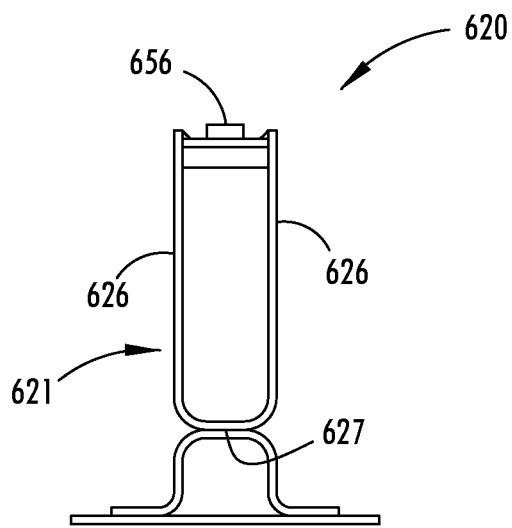
FIG. 11 is a cross-sectional view of a crossmember with a weld nut.
Figure 11A:
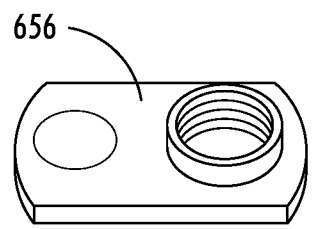
FIG. 11A is a perspective view of the weld nut shown in FIG. 11.

As shown in FIG. 11, another example of a crossmember 620 has a beam 621 that is reinforced with threaded receivers 656 along the upper portion of the crossmember 620. The beam 621 has an open cross-sectional shape with the parallel side walls 626 that integrally extend upward from a lower wall 627 of the beam 621. The open cross-sectional shape of the beam 621 shown in FIG. 11 is generally a U shape, whereby the threaded receivers 656 engage between the upper portions of the side walls 626 of the beam 621. The side walls 626 are separated at a constant spacing along the linear length of the beam 621 that is configured to fit a threaded receiver between the side walls, such as the 9.6 mm spacing shown in FIG. 11. The threaded receivers 656, such as tab nuts, may be welded to an upper surface of a strip of sheet metal, which is then placed inside of the U-shaped cross section of the beam 621. The strip of sheet metal is then be welded to the inside surface of the side walls 626, such as by positioning the tab nuts at the desired position, clamping the strip of sheet metal and tab nuts in place by forcing the side walls toward each other, and welding along the upper edges of the strip of sheet metal. It is also conceivable that the threaded receivers may be other types of nuts or the like. The threaded receivers 656 are configured to threadably engage a fastener that is inserted through the fastener openings the tab nuts, so as to secure at least one of a battery module or tray cover to the crossmember.

Figure 12:
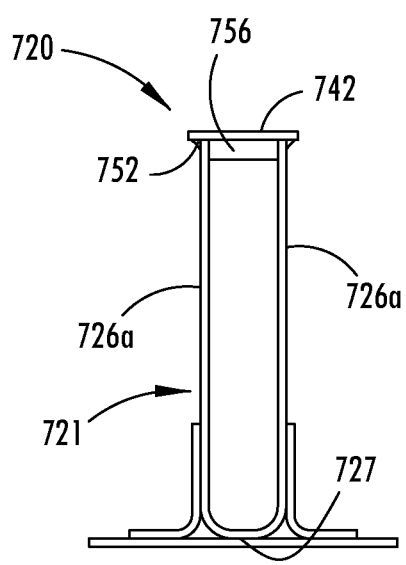
FIG. 12 is a cross-sectional view of a crossmember with a weld nut.
Figure 13:
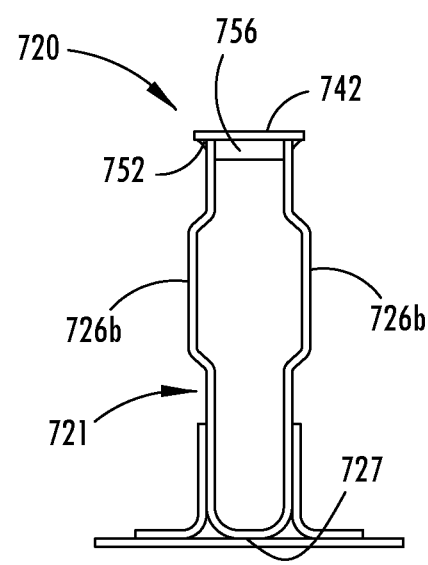
FIG. 13 is a cross-sectional view of a crossmember with a weld nut.

As also shown in FIGS. 12 and 13, another example of a similar crossmember 720 has a beam 721 that is reinforced with a top cap 742 that disposes threaded receivers 756 along the upper portion of the crossmember 720. The beams 721 shown in FIGS. 12 and 13 have alternative open cross-sectional shapes from that shown in FIG. 11, such as with parallel side walls 726a (in FIG. 12) that integrally extend upward from a lower wall 727 of the beam 721 and with symmetrical side walls 726b (in FIG. 13) that integrally extend upward from a lower wall 727 of the beam 721. These different cross-sectional shapes may provide different bending stiffness to the cross member and may accommodate different batter modules for the associate battery tray. The open cross-sectional shape of the beam 721 shown in FIGS. 12 and 13 has a generally U shape, whereby the threaded receivers 756 engage between the upper portions of the side walls 726 of the beam 721. The side walls 726 are separated at a constant spacing along the linear length of the beam 721 that is configured to fit a threaded receiver 756 between the upper portion of the side walls 726a, 726b.

The top cap 742, such as shown in FIGS. 12 and 13, may be a strip of metal that engages the upper portions of the side walls 726. The top cap 742 may be formed from a sheet that has a greater thickness than the sheet of material formed into the beam 721, such as to provide increased mass at the upper portion of the beam and increase bending strength along the top cap 742. As also shown in FIGS. 12 and 13, the top cap 742 may have fastener openings that are disposed at spaced intervals along the linear length top cap, such that a threaded receiver 756, such as a M5 nut or the like, may be fit in and attached to each of the fastener openings prior to joining the top cap 742 to the beam 721. Again, the threaded receivers may be other types of nuts or the like. As shown in FIGS. 12 and 13, the top cap 742 is disposed in generally perpendicular orientation relative to the side walls 726, such that they may be attached together to form T-joints on opposing sides of threaded receivers 756 that are disposed along the upper portion of the beam 741. Thus, the top cap 742 may extend laterally beyond the upper edges of the side walls 726 to provide an externally accessible weld seam 752 between the top cap 742 and the side walls 726a, 726b.

Figure 14A:
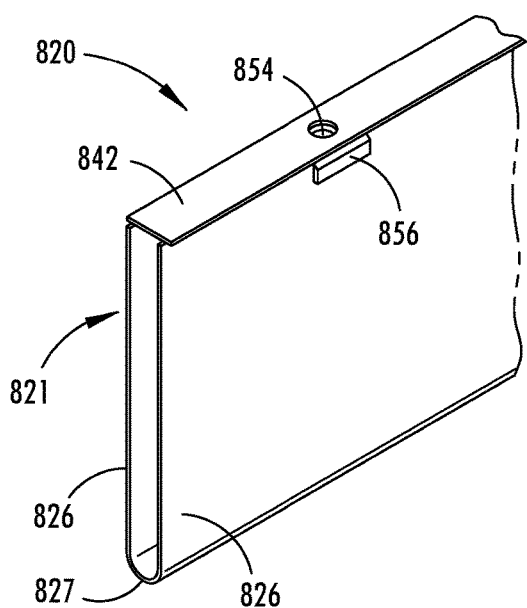
FIG. 14A is an upper perspective view of a crossmember with a T-slot nut.
Figure 14B:
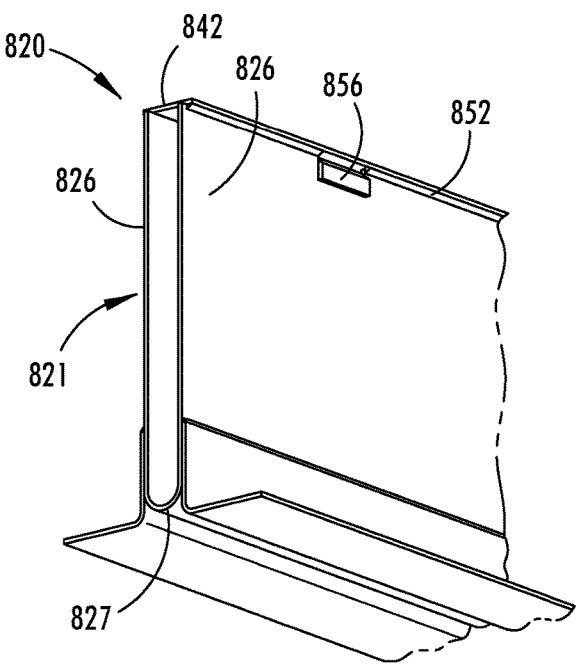
FIG. 14B is a lower perspective view of the crossmember shown in FIG. 14A.
Figure 14C:
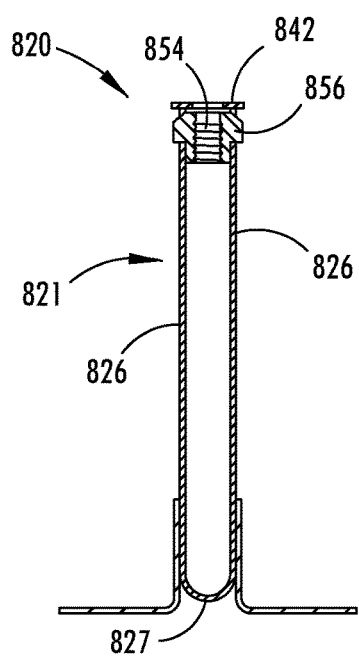
FIG. 14C is a cross-sectional view of the crossmember shown in FIG. 14A.

As shown in FIGS. 14A-14D, another example of a crossmember 820 has a beam 821 that is reinforced with a top cap 842 along the upper portion of the crossmember 820. The beam 821 has an open cross-sectional shape with the parallel side walls 826 that integrally extend upward from a lower wall 827 of the beam 821 so as to generally provide a U shape. The top cap 842 shown in FIGS. 14A-14D is a strip of metal that engages the upper portions of the side walls 826. Specifically, as shown in FIG. 14C, the planar extent of the top cap 842 is disposed in generally perpendicular orientation relative to the side walls 826, such that upper edges of the side walls 826 contact the top cap 842 to form a T-joints at each of the side walls 826. The top cap 842 extends laterally beyond the upper edges of the side walls 826 to provide an externally accessible weld seam 852 between the top cap 842 and the side walls 826, such as via laser welding or electric resistance welding or the like. The top cap 842 may be formed from a sheet that has a greater thickness than the sheet of material formed into the beam 841, such as to provide increased mass at the upper portion of the beam 821 and increase bending strength along the top cap 842.

Figure 14D:
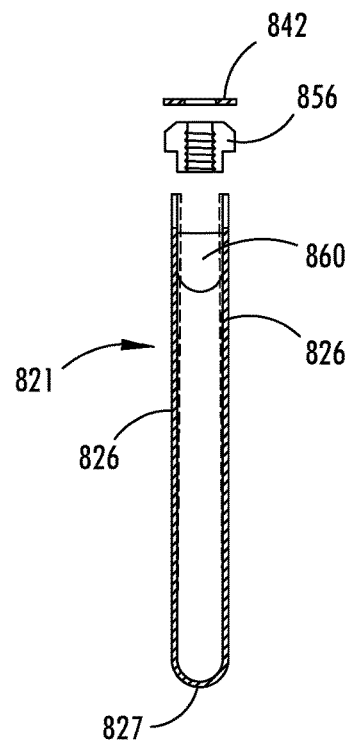
FIG. 14D is an exploded cross-sectional view of the crossmember of FIG. 14A.

As further shown in FIGS. 14A-14D, the top cap 842 may have fastener openings 854 that are disposed at spaced intervals along the linear length top cap 842, such that a threaded receiver 856, such as a T-slot nut or the like, may be fit in in slots disposed along the upper edges of the side walls 826 and disposed below the fastener openings 854 prior to joining the top cap 842 to the beam 821. As shown in FIG. 14D, the side walls 826 may be slightly over bent toward each and then a tool 860 may inserted between the side walls 826 to hold the side walls 826 apart at a spacing that corresponds with the T-slot nut 856. With the spacing between the side walls 826 maintained, T-slot nut 856 may then be inserted into the slots in the upper edges of the side walls 826. Optionally, the T-slot nut 856 may be loaded onto the tool prior to tool installation between the side walls, provided that the tool installation also aligns the nuts on the beam, such as at the slots. The top cap 842 may be disposed over the nuts and against the upper edges of the side walls 826, such as to form a T-joints at each of the side walls 826. The assembled beam 821, tool 860, nut 856, and top cap 842 may then be held in place with at least some clamping to form the weld 852 between the side walls 826 and the top cap 842. After welding, the tool 860 may be removed.

Figure 15A:
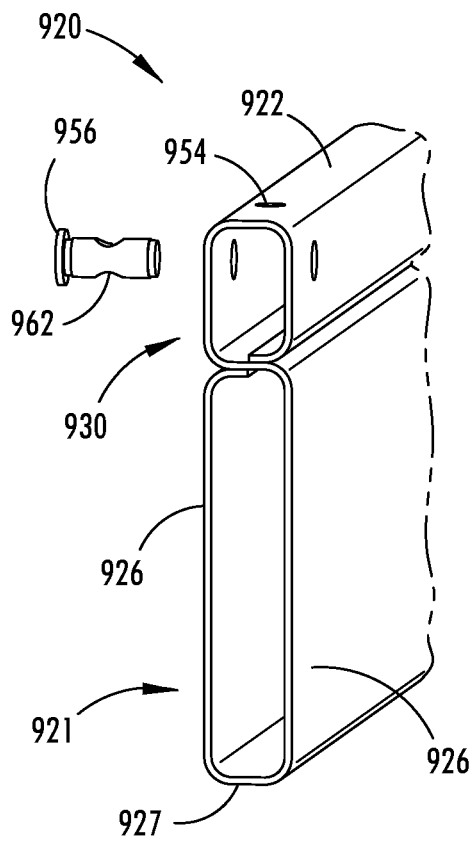
FIG. 15A is an upper perspective view of a crossmember with a dowel nut exploded away from the beam.
Figure 15B:
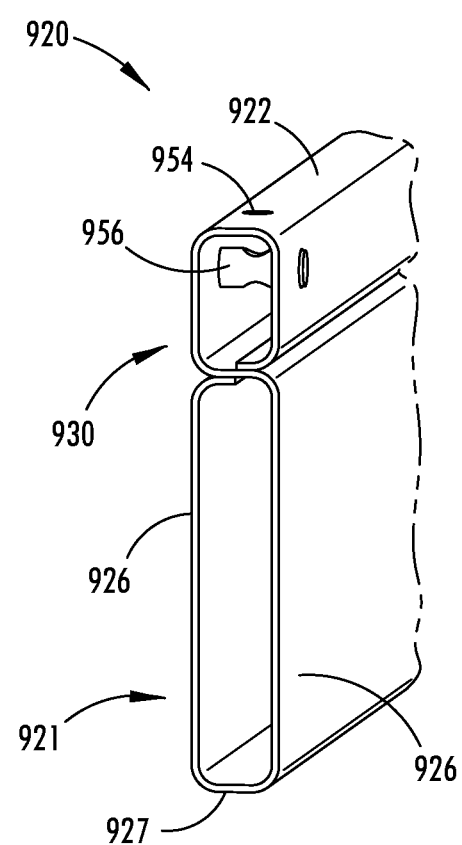
FIG. 15B is an upper perspective view of the crossmember shown in FIG. 15A with the dowel nut attached to the beam.

As shown in FIGS. 15A and 15B, an additional example of a crossmember 920 is shown that has a closed cross-sectional shape that is configured to support a battery module and/or a cover of the battery tray at a top wall 922 of the beam. The top wall 922 of the beam shown in FIG. 15A is reinforced by the cross-sectional shape of the beam, which has an increased amount of material along an upper portion 930 of the beam. Specifically, the closed cross-sectional shape of the beam 921 shown in FIG. 15A has a roll formed geometry that provides two adjacent tubular profiles that have hollow openings that are divided by a common center wall of the beam that is generally parallel with the top wall 922. With such a monoleg profile, the tubular profile at the upper portion 930 has a smaller hollow interior area than the lower tubular profile, which may provide increased bending strength along the top wall 922.

As further shown in FIGS. 15A and 15B, the threaded receivers 956 disposed at the upper portion 930 of the beam are shown as dowel nuts that extends laterally between the side walls 926 of the beam. The dowel nuts 956 have threaded transverse openings 962 that are aligned with the fastener openings 954 disposed in the top wall 922 at spaced intervals along the linear length of the beam. The aligned openings 954, 962 and configured to receive fasteners that secure at least one of a battery module or tray cover to the crossmember 920. The dowel nuts 956 may be welded or otherwise fixed to the beam 921 to maintain the alignment of the openings 954, 962. Optionally, in addition or in the alternative to fixing the dowel nuts to the beam, the dowel nuts and/or lateral openings in the side walls that receive the dowel nuts may include a non-circular formation that prevents rotation of the dowel nut relative to the beam, such that the alignment of the openings is maintained.

The crossmember disclosed herein may be incorporated with various applications of different structural components, such as the vehicle floor frame itself. The crossmember may also be designed to support and sustain different loading conditions, such as for supporting certain axial loading conditions. The cross-sectional geometry, material type selections, and material thickness within the cross-sectional profile of the components of the crossmember may be configured for such a particular use and the desired loading and performance characteristics of the beam, such as the beam weight, the load capacity of the beam, force deflection performance of the beam, and impact performance of the beam, and the like.

For purposes of this disclosure, the terms "upper," "lower," "right," "left," "rear," "front," "vertical," "horizontal," "inner," "outer," "inner-facing," "outer-facing," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A crossmember for a vehicle battery tray, the crossmember comprising:
   a beam having a closed cross-sectional shape with a top wall coupled with parallel side walls along a length of the beam;
   a reinforcing top cap having a C-shaped transverse cross-sectional shape comprising (i) a central section disposed along the top wall of the beam and (ii) legs extending from opposing sides of the central section and attached to the side walls of the beam, wherein the legs each include a plurality of tabs welded to the side walls; and
   wherein the top wall of the beam and the central section of the top cap have aligned fastener openings disposed at spaced intervals along the length of the beam.

2. The crossmember of claim 1, further comprising a plurality of threaded receivers disposed at the aligned fastener openings and configured to engage a fastener inserted through the fastener openings to secure at least one of a battery module or tray cover to the crossmember.

3. The crossmember of claim 2, wherein upper portions of the side walls are separated at a constant spacing along the length of the beam that is dimensioned to fit the threaded receiver between the upper portions of the side walls.

4. The crossmember of claim 3, wherein the plurality of threaded receivers are attached to at least the top wall or one of the side walls of the beam.

5. The crossmember of claim 1, wherein a lower portion of the legs of the top cap are angled inward toward each other to provide a biasing force against the side walls of the beam.

6. The crossmember of claim 1, wherein the top cap includes a bend radius between the central section and the legs that is less than a bend radius between the top wall and the side walls of the beam.

7. The crossmember of claim 1, wherein the top wall and the side walls of the beam are formed together as a single integral piece, and wherein the top wall of the beam is disposed in a perpendicular orientation relative to the side walls of the beam.

8. A crossmember for a vehicle battery tray, the crossmember comprising:
   a beam having side walls spaced from each other along a length of the beam;
   a reinforcing top cap disposed along an upper portion of the beam and spanning between the side walls;
   wherein the reinforcing top cap comprises a series of tabs disposed along the length of the beam and that extend down from opposing sides of a central section of the top cap to attach to the side walls of the beam;
   wherein the series of tabs are each individually welded to the respective side wall; and
   wherein the reinforcing top cap comprises fastener openings that extend through the central section of the top cap at spaced intervals along the length of the beam.

9. The crossmember of claim 8, wherein the beam comprises a top wall connecting between upper edges of the side walls and a bottom wall connecting between lower edges of the side walls to together provide a closed cross-sectional shape extending along the length of the beam.

10. The crossmember of claim 9, wherein the top wall includes a plurality of openings that align with the fastener openings in the reinforcing top cap, and wherein the plurality of openings in the top wall have a larger diameter than the fastener openings.

11. The crossmember of claim 9, wherein the top wall, the side walls, and the bottom wall of the beam are together a single integral piece that is roll formed from a metal sheet.

12. The crossmember of claim 11, wherein a thickness of the central section of the top cap is greater than a thickness of the metal sheet of the beam.

13. The crossmember of claim 9, wherein bends between the central section and series of tabs have a radius of curvature that is less than a radius of curvature of bends between the top wall and side walls of the beam.

14. The crossmember of claim 8, further comprising a plurality of threaded receivers disposed at the reinforcing top cap in alignment with the fastener openings and configured to threadably engage a fastener inserted through the fastener openings.

15. The crossmember of claim 14, wherein the side walls are separated from each other at a constant spacing along the length of the beam, and wherein the constant spacing between the side walls is dimensioned for the plurality of threaded receivers to fit between the side walls.

16. The crossmember of claim 8, wherein the tabs of the reinforcing top cap extend at an inward angle toward each other as they extend downward from the central section to be biased against outside surfaces of the beam for providing a stable weld condition.

17. A crossmember for a vehicle battery tray, the crossmember comprising:
   a beam having side walls separated from each other along a length of the beam;
   a top wall coupled with upper edges of the side walls along the length of the beam, wherein the top wall has a greater thickness than the side walls, and wherein the top wall comprises fastener openings disposed at spaced intervals along the length of the beam; and
   a plurality of threaded receivers attached to the top wall in alignment with the fastener openings and configured to threadably engage a fastener inserted through the fastener openings to secure at least one of a battery module or tray cover to the top wall.

18. The crossmember of claim 17, wherein the plurality of threaded receivers are disposed between the side walls, and wherein the side walls are separated at a constant spacing along the length of the beam that is generally equal to a width of the plurality of threaded receivers, and wherein the plurality of threaded receivers comprise at least one of a dowel nut, a slot nut, a self-pierce and clinch nut, or a weld nut.

19. The crossmember of claim 17, wherein the top wall comprises a metal strip that is welded to upper portions of the side walls.

20. The crossmember of claim 17, further comprising a reinforcing top cap having a C-shaped transverse cross-sectional shape comprising (i) a central section defining the top wall and (ii) legs extending from opposing sides of the central section and attached to the side walls of the beam, wherein the legs each include a plurality of tabs welded to the side walls.

* * * * *